United States Patent [19]

Lathlaen

[11] 4,237,844

[45] Dec. 9, 1980

[54] SIGNAL GENERATING APPARATUS

[75] Inventor: Richard A. Lathlaen, Hatfield, Pa.

[73] Assignee: TRW, Inc., Cleveland, Ohio

[21] Appl. No.: 925,376

[22] Filed: Jul. 17, 1978

[51] Int. Cl.[3] .......................... F02P 3/02; F02P 1/00; H01V 5/00; G01P 3/48

[52] U.S. Cl. .................................. 123/617; 123/414; 123/418

[58] Field of Search ........ 123/148 E, 117 R, 146.5 A; 340/174; 322/DIG. 5; 324/173; 73/371

[56] References Cited

U.S. PATENT DOCUMENTS

| | | | |
|---|---|---|---|
| 3,757,754 | 9/1973 | Wiegand | 123/148 E |
| 3,837,325 | 9/1974 | Minks et al. | 123/148 E |
| 3,838,298 | 9/1974 | Torres | 123/148 E |
| 3,923,030 | 12/1975 | Luteran | 123/148 E |
| 3,991,730 | 11/1976 | Crall | 123/148 E |
| 4,001,687 | 1/1977 | Sorkin et al. | 324/173 |
| 4,008,701 | 2/1977 | Webber | 123/148 E |
| 4,011,476 | 3/1977 | Beard | 322/DIG. 5 |
| 4,109,630 | 8/1978 | Richesen, Jr. et al. | 123/148 E |

*Primary Examiner*—Charles J. Myhre
*Assistant Examiner*—Raymond A. Nelli
*Attorney, Agent, or Firm*—Jacob Trachtman

[57] ABSTRACT

A signal generating apparatus comprising a bistable magnetic device which alters its magnetic state when the density of magnetic flux to which it is subject passes through a predetermined value, and detecting means providing an output signal responsive to a change of magnetic state of the bistable device. A conducting means for magnetic flux subjects the bistable magnetic device to magnetic flux conducted therethrough and comprises a first portion providing a path of high permeability and a second portion providing a path of alterable permeance for varying the reluctance of the conducting means and the density of magnetic flux to which the bistable device is subject. An energizing means provides a controllable magnetic field for inducing magnetic flux in the conducting means and provides a flux density sufficient to alter the state of the bistable device with the variation of reluctance of the conducting means.

27 Claims, 9 Drawing Figures

SIGNAL GENERATING APPARATUS

Figure 1:
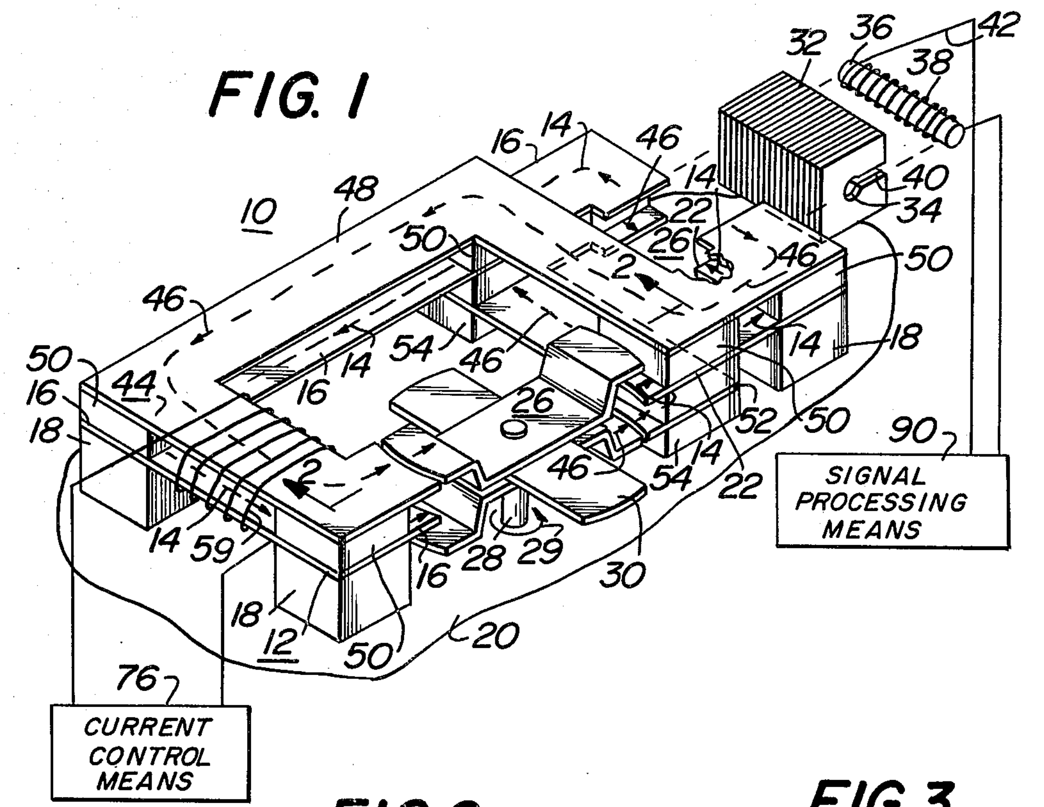

The invention relates to a signal generating apparatus, and more particularly to an apparatus for generating signals for selected angular positions of a rotary member.

Automobile engine ignition systems provide timed sparks to their cylinders for igniting their fuel mixture at specific times during their combustion cycles. Such systems utilize a low voltage primary circuit which includes a battery, an ignition timing switch with a pair of breaker points actuated by the breaker cam shaft of an engine, a capacitor connected across the breaker points, and the primary winding of an ignition coil. A high voltage secondary circuit is provided by the many turns of the secondary winding of the ignition coil, a rotary distributor switch, and the spark plugs received by the cylinders of the engine.

In operation, when the breaker points of the switch are closed, current flows from the battery through the breaker points and the primary winding of the ignition coil. The current through the primary winding induces magnetic flux around the ignition coil. The opening of the breaker points is timed by the rotation of the engine. This opens the circuit through the switch, causing current to flow into the capacitor and rapidly decrease in the primary winding of the coil. This results in the rapid collapse of flux about the induction coil inducing a high voltage in the secondary winding, which is delivered by the distributor switch to the spark plug of a selected cylinder of the engine. In this manner high voltage timed signals are generated and delivered to each of the spark plugs in the required sequence for proper operation of the engine.

The breaker points open to deliver the high voltage signal to the spark plug of a cylinder at a time before maximum compression of combustable fuel. The exact time at which the spark is delivered for optimum operation of the engine depends upon the engine speed and load. The "timing" of the opening of the breaker points is advanced or made earlier at high engine speed, and is usually activated by centrifugal force provided by small weights which are driven by the breaker cam shaft.

Improvements have been made in the conventional ignition system described, by providing a solid state switching device, such as a transistor, in place of the breaker points. The transistor is capable of interrupting the primary current without wearing or burning which are major defects of the mechanical breaker point type of distributors. In another form of device, the breaker points, or other triggering devices based upon magnetic and optical effects, are still used but only to control the transistor. In such devices, only a small control current is required compared to the current in the primary circuit.

In addition to the above ignition systems, a current discharge system has been utilized in which a capacitor is charged to several hundred volts. When an ignition spark is required, the capacitor is discharged through the primary winding of the ignition coil. A switching transistor which is controlled by breaker points, or other triggering devices, is turned on to deliver the capacitor current to the primary winding of the induction coil. The sudden applications of high current to the primary winding produce high voltage signals in the secondary winding which are delivered to the spark plugs as described above.

The present invention relates to a signal generating means which, among many other uses, may be utilized for providing highly accurate and controlled timing signals for activating a switch or transistor to produce high voltage signals for delivery by a distributor which may be of the conventional type, to the spark plugs of an internal combustion engine. The signal generating means provides output signals which are deliverable at selected angular positions of a rotary member and are not dependent upon the rotational rate or speed at which it is operated. The output signals may also be easily controlled and advanced by an electrical control signal.

It is, therefore, an object of the present invention to provide a new and improved signal generating means for providing timed output signals.

Another object of the present invention is to provide a new and improved signal generating apparatus for providing timing signals for a breakerless automobile ignition system.

Another object of the present invention is to provide a new and improved signal generating apparatus for providing timing signals at selected angular positions of a rotary member and which may be controlled for advancing or retarding selected output signals.

Another object of the present invention is to provide a new and improved rotary signal generating apparatus which provides an output signal which is a selected function of its rotary position.

Another object of the present invention is to provide a new and improved signal generating apparatus utilizing a bistable magnetic device as an electronic position sensor for providing signals for an ignition system of an internal combustion engine.

Another object of the present invention is to provide a new and improved signal generating apparatus for sensing shaft positions of rotary devices.

Another object of the present invention is to provide a new and improved signal generating apparatus of high efficiency, reliability and durability.

The above objects and advantages, as well as many other advantages are achieved by providing a signal generating apparatus comprising a bistable magnetic device which alters its magnetic state when the density of magnetic flux to which it is subject passes through a predetermined value. A conducting means for magnetic flux subjects the bistable magnetic device to conducted magnetic flux with a density which passes through the predetermined value for altering the state of the bistable magnetic device. The conducting means includes a first portion providing a path of high permeability, and the second portion providing a path of alterable permeance, for varying the reluctance of the conducting means and the density of the magnetic flux to which the bistable device is subject. An energizing means having an energizing coil would about the first portion of the conducting means provides a controllable magnetic field for producing magnetic flux in the conducting means for providing a flux density sufficient to alter the state of the bistable device with variation of reluctance of the conducting means. A detecting means provides an output signal responsive to each change in the magnetic state of the bistable device.

The path of alterable permeance of the second portion of the conducting means, in one form, is provided by a rotatable member having at least one element of high permeability, which provides a minimum value of reluctance when it is in one of its angular positions and a maximum value of reluctance when it is in another angular position displaced from the first position. The member provides reluctance values varying between the minimum and maximum values as a continuous function of its angular position. The energizing means comprises an energizing source which provides direct current to the energizing coil, with the value of the direct current being adjustable for determining the angular position of the member at which the bistable device is subject to the predetermined value of flux density for altering its magnetic state and for which the detecting means provides an output signal.

The signal generating apparatus is particularly useful for producing timing signals for an ignition system of an internal combustion engine. The member is provided with a shaft which is adapted for being rotatably driven in synchronism with the crank shaft of the internal combustion engine to provide spark timing signals derived from the detecting means. The energizing source varies the value of direct current provided to the energizing coil for advancing and retarding the occurrence of output signals of the detecting means with respect to the angular position of the member for being responsive to the spark timing requirements of the internal combustion engine.

In another use, the signal generating means provides output signals which indicate the angular position of a rotatable member, and the generating means can be adjusted so that output signals are provided for selected angular positions of a rotatable member, as well as providing marker signals for indicating the first of a plurality of output signals. In such uses an advantage of the signal generating apparatus is that neither the amplitude nor timing of the output signals is effected by the speed or rate of angular rotation of the rotary member.

Figure 2:
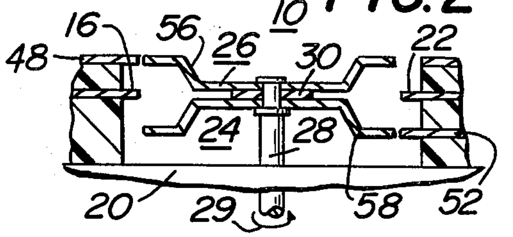
Figure 3:
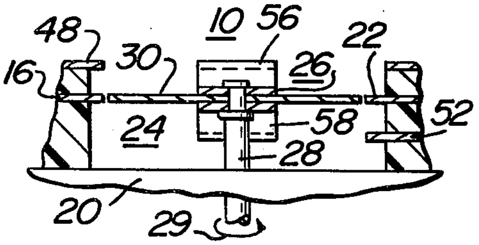
Figure 8A:
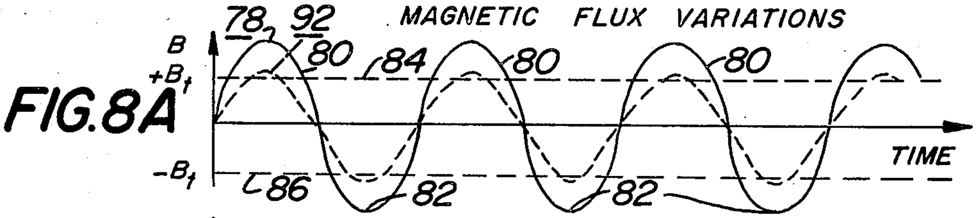
Figure 8B:
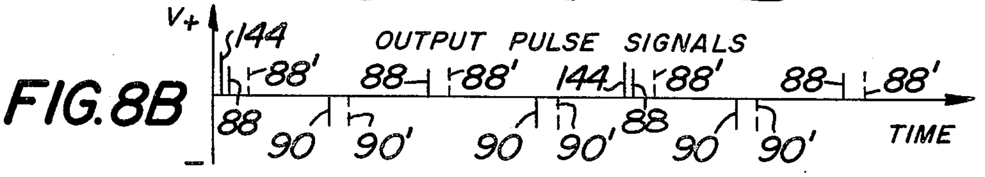
Figure 4:
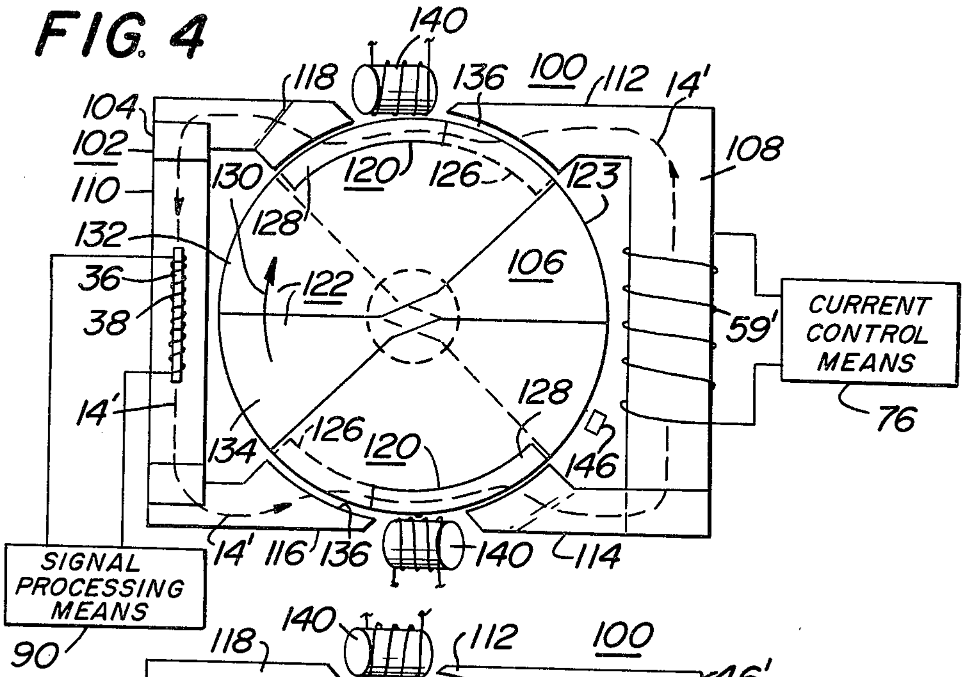
Figure 5:
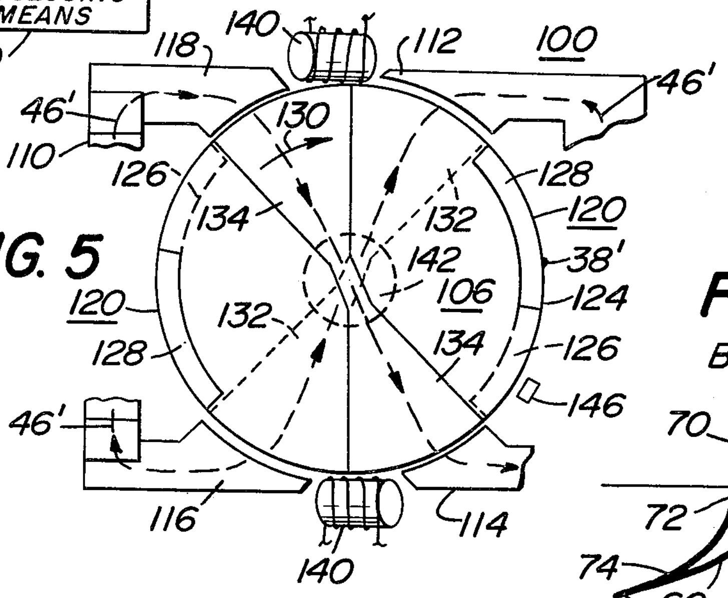
Figure 7:
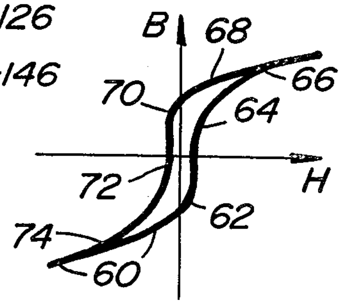
Figure 6:
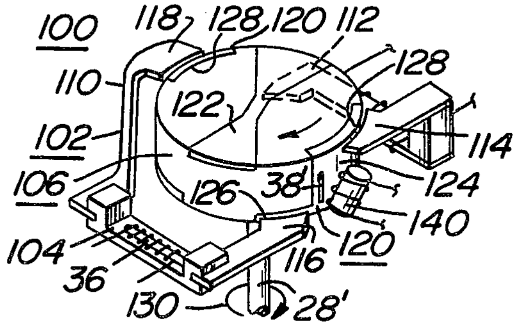

The foregoing and other objects of the invention will become more apparent as the following detailed description of the invention is read in conjunction with the drawings in which:

FIG. 1 is a diagrammatic perspective view with a portion exploded of a signal generating apparatus embodying the invention, FIG. 2 is a sectional view taken on line 2—2 of FIG. 1, FIG. 3 is a sectional view similar to that of FIG. 2 showing the signal generating apparatus with its rotary member angularly displaced 90°, FIG. 4 is a diagrammatic top plan view of another embodiment of the signal generating apparatus, FIG. 5 is a view similar to that of FIG. 4 showing the signal generating apparatus with its rotary member angularly displaced by 90°, and with portions broken away, FIG. 6 is a perspective view of the apparatus of FIG. 4, FIG. 7 is a graph illustrating the hysteresis characteristic of a bistable magnetic device, and FIGS. 8A and 8B are graphs illustrating respectively wave forms and output signals provided by the signal generating apparatus.

Like references designate like parts throughout the several views.

FIGS. 1, 2 and 3 illustrate a signal generating apparatus 10 embodying the invention. The apparatus 10 includes a conducting means 12 for magnetic flux in a first circuit 14 having an "0" configuration. The conducting means 12 includes a substantially "L" shaped portion 16, of high permeability, such as provided by known ferromagnetic materials. The portion 16 rests on a plurality of non-magnetic blocks 18 positioned on a supporting surface 20. A second smaller substantially "L" shaped portion 22, of high permeability, is also supported on blocks 18 and has an end spaced from an end of the portion 16 to provide between them a gap 24 (see FIGS. 2 and 3). The other end of portion 22 is spaced from the other end of portion 16 to provide between them a space 26 (see FIG. 1). The gap 24 is an air gap providing a permeability which is lower than that provided by the portions 16 and 22 of the first circuit 14.

A member 26 supported for rotation on a shaft 28 which extends through the surface 20, is positioned within the gap 24. The member 26 provides a substantially elongated horizontal element 30 of high permeability (see FIG. 3) for conducting magnetic flux in the first circuit 14. When the member 26 is rotated 90° into the position illustrated in FIGS. 1 and 2, a maximum air gap is provided between the portions 16 and 22 providing minimum permeance. The rotation of member 26 between the positions of maximum and minimum permeance provides a value of permeance which varies between the maximum and minimum values as a continuous function of the angular position of the member 26.

The space 26 between the portions 16 and 22 of the conducting means 12 receives therein a coupling means 32 comprising a plurality of vertical sections made of a high permeability material and providing an opening 34 into which is received a bistable magnetic device 36 and a signal detecting coil 38 wound therealong. The grooves 40 at the ends of the coupling means 32 receive therethrough the leads 42 of the coil. The operation of the bistable magnetic device 36 and its detecting coil 38 will be explained in greater detail below.

The first circuit 14 for magnetic flux is shown by the arrows extending in the counter clockwise direction along the portion 16, through the gap 24, and the member 26 to the portion 22. The flux extends from the portion 22 through the coupling means 32 and bistable magnetic device 36 back to the portion 16 to complete the path of substantially "0" configuration. The reluctance of the circuit 14 is maximized and minimized when the member 26 is positioned as shown respectively in FIGS. 2 and 3, and the reluctance of the circuit 14 varies between the maximum and minimum values as a continuous function of the angular position of the member 26.

A second conducting means 44 provides a second magnetic circuit 46 having an "8" configuration which includes a substantially "S" shaped portion 48 of high permeability. The portion 48 is supported by plurality of block 50 above the conducting means 12. A second portion 52 of the conducting means 44 which is substantially "J" shaped is supported on non-magnetic blocks 54 under the portions 16 and 22 of the first conducting means 12.

Respective ends of the portions 48 and 52 are also present at the gap 24 and space 26, the ends of the portion 48 being at a higher level than the ends of the portion 52 (see FIGS. 1 and 2). In the gap 24, the member 26 provides a pair of elongated elements 56 and 58 of high permeability, one above the other (FIG. 2), which extend perpendicularly to the extending direction of the element 30. The ends of the element 56 extend upwardly to the level of the portion 48 of the second circuit 46, while the ends of the element 58 extend downwardly to the level of the lower second portion 52 of the conducting means 44.

With the member 26 positioned as shown in FIGS. 1 and 2, a magnetic path in circuit 46 of maximum permeance is provided by the elements 56 and 58 through the gap 24, while the gap 24 provides minimum permeance when the member 26 is in its position shown in FIG. 3. The permeance provided by the elements 56 and 58 varies between the maximum and minimum values as a continuous function of the rotary position of the member 26. The magnetic flux path of circuit 46 is shown by the dashed lines and arrows and extends along the portion 48 of the second conducting means 44 to the gap 24 and then through the elevated end of the upper element 56 of member 26 and the central portion of the element 30 into the lower element 58 and its lower end which is closest to the end of the portion 52 at the gap 24. The magnetic path of circuit 46 continues along the portion 52 to its end joining coupling means 32, where it enters the coupling means 32 and the bistable device 36 in a direction or sense opposite to the direction or sense of the flux of circuit 14, and returns at the other side of the coupling means 32 to the higher end of the portion 48 to complete the "8" shaped magnetic path.

As noted in connection with the circuit 14, the rotation as shown by arrow 29 of the member 26, from its position shown in FIG. 1, increases the reluctance of the circuit 46 from its minimum value. The maximum reluctance is provided after a 90° rotation of the member 26 to its position shown in FIG. 3. At this time, the greatest air space is present between the spaced ends of the elements 48 and 52 of the conducting means 44 at the gap 24. As also noted before, the reluctance varies between the minimum and maximum values as a function of the angular displacements of the shaft 28. However, the value of reluctance provided by the member 26 for the first circuit 14 is out of phase with that provided for the second circuit 46, their respective minimum and maximum values occurring at positions 90° apart. One minimum and one maximum value of reluctance is obtained for each circuit with each 180° of rotation of the member 26, providing two minimum and two maximum values in each circuit 14 and 46 for each complete rotation of 360°.

An energizing solenoid coil is provided having a winding 59 about the portions 16 and 48 of the conducting means 12 and 44 at a region where they extend over each other. The winding 59 provides a magnetic field for inducing magnetic flux in the circuits 14 and 46. At the region of the winding 59 the flux induced in each of the circuits 14 and 46 is in the same direction or sense as illustrated by the dashed lines and arrows for the respective flux paths. The flux in the circuit 14 of the conducting means 12, thus, moves in a counter clockwise direction in its "0" configuration path extending through the coupling means 32 and the bistable magnetic device 36 contained therein. On the other hand, a magnetic circuit 46 provided by the conducting means 44 which has an "8" configuration, crosses over itself and is presented in the opposite direction or sense through the coupling means 32 and the bistable magnetic device 36.

Since the reluctance in each of the circuits 14 and 46 of the conducting means 12 and 44 varies between maximum and minimum values, the flux of their respective circuits also vary in a corresponding inverse manner. Because of the 90° displacement between the element 30 and the elements 56, 58 of the member 26, the net flux through the coupling means 32 increases to a maximum value in one sense, decreases to zero, and then increases to a maximum value in the opposite sense with the rotation of the member 26. Thus, the amplitude and sense of the flux lines to which the bistable magnetic device 36 is subjected, is a function of the angular position of the member 26, going through two complete cycles for each revolution of the member 26.

The bistable magnetic device 28 may be of the type described in U.S. Pat. No. 3,820,090 issued June 25, 1974 entitled "Bistable Magnetic Device," and comprises a wire of general uniform composition having a central relatively "soft" core portion and an outer relatively "hard" magnetized shell portion with relatively low and high coercivities, respectively. Such a wire or device 36 may be made by properly work hardening a homogeneous magnetic alloy to provide the relatively hard shell portion of high coercivity with respect to the central core. The device provides a high energy state when its flux extends externally, and a low energy state when its flux is substantially internal. In the low energy state the flux in the shell captures and has a return path through the core of the device. Switching of the bistable magnetic device 36 occurs when the density of an applied external flux passes through a value which allows the applied flux to capture the core of the device from its shell. This results in a rapid increase in external flux density known as the "Wiegand Effect." This effect is detected as an output pulse signal by the coil 38. This phenomenon is also explained in detail in the article entitled "Wiegand Wire: New Material For Magnetic-Based Devices" by Philip E. Wignen in Electronics dated July 10, 1975, and in the article entitled "Wiegand Pulses Break Through Into New Application" in Canadian Controls & Instrumentation dated December 1977.

The hysteresis curve of FIG. 7 illustrates a magnetic switching characteristic of the bistable magnetic device 36. However, the invention may also utilize devices with other switching characteristics such as those illustrated in U.S. Pat. No. 3,820,090 and the noted article by Philip E. Wignen.

In considering the operation of the bistable magnetic device 32, the upwardly sloping portion 60 of FIG. 7 illustrates the change in magnetic density B of the bistable device 36 with the increase of applied magnetic field intensity H. When the intensity H reaches the level 62, a rapid change in flux density B in the upward positive direction occurs due to the switching of the bistable magnetic means 36. At this time, the flux density B represented as a negative value reduces to and passes through zero value and increases in the opposite direction to a high value of flux density B of opposite sense represented as a positive value in FIG. 7. This rapid transition is illustrated by the almost vertical line 64. The further increase of the magnetic field intensity H in the positive direction results in a smaller increase in flux density B as illustrated by the reduced slope of line 66. With the reduction of the magnetic field intensity H to zero value, and its increase in the negative direction, a gradual reduction in flux density B takes place as illustrated by the slope of line 68. When the magnetic field intensity H reaches a value in the negative direction shown at the point 70, a rapid change in the flux density B again occurs as illustrated by the almost vertical line 72. At this time, the flux density B moves downwardly through zero value and increases in the opposite negative direction to the level illustrated at 74. This rapid reversal of flux density B is the second switching action during the hysteresis cycle establishing a state for the bistable magnetic device 32 with its magnetic flux external and in the opposite direction. Continued increase in the negative value of the magnetic field intensity H, results in a gradual increasing in magnetic flux density B in the negative sense as illustrated by the line 60.

A new cycle for the hysteresis curve of FIG. 7 is initiated, when the negative magnetic field intensity H approaches zero value and continues to increase in the positive direction to the point 62. At this time, the bistable magnetic means 36, again switches its state. Thus, for each increase and decrease of magnetic intensity H first in one sense and then in the opposite sense, the bistable magnetic means 36 rapidly changes its external magnetic flux from a maximum value in one sense to a maximum value in an opposite sense. This results in the coil 38 producing an output pulse signal for each flux reversal, one pulse being positive with respect to the other.

Refer to FIGS. 8A and 8B for an explanation in greater detail of the operation of the signal generating apparatus 10. With a direct current applied to the coil 59, magnetic flux B is induced in the first and second circuits 14 and 46. The level of the magnetic field intensity H is controlled by a current control means 76 (FIG. 1) allowing adjustment of the maximum value of induced magnetic flux B. Rotation of the rotary means 26 periodically increases and decreases the reluctance in the circuits 14 and 46 as a function of rotary position. This results in the variation of magnetic flux in each of the respective circuits, with the fluxuation of the magnetic flux in one circuit being delayed by 90° with respect to the other. The flux of each circuit passes through the coupling means 32 in a direction opposite to that of the other. The resultant flux density B and sense is represented by the curve 78 of FIG. 8A. The positive portions 80 of the alternating curve represents the variation of flux through the coupling means 32 and the bistable device 36 in the direction of circuit 14, while the negative portions 82 of the curve 78 represents the net magnitude of flux in the opposite direction of circuit 46. The pair of horizontal dashed lines 84 and 86 represent the respective levels of flux density $B_t$ in the sense of circuits 14 and 46 which trigger a transition of state of the bistable device 36 as the flux intensity increases in the same sense. The flux density $B_t$, which is derived from the field of the energizing coil 59, is related to the value of the field intensity H and results in the transition of the bistable device 36 from one of its states to the other illustrated in FIG. 7. The rapid change in flux about the bistable magnetic device 36 which takes place with each such transition is detected by the coil 38. This results in the delivery of a pulse 88 to a signal processing means 90 (FIG. 1). The pulses 88 are shown on the graph of FIG. 8B to correspond to the transition points for the positive portions 80 of the curve 78.

As the rotary member 26 changes position by rotation in the counter clockwise direction as illustrated by the arrow 29, a maximum of magnetic flux is provided at the coupling means 32 when the element 30 is in alignment with the ends of the portions 16 and 22 (FIG. 3) for providing minimum reluctance in the circuit 14. As the rotary means 26 continues its movement in the counter clockwise direction, reluctance in the circuit 14 increases while that in the circuit 46 decreases to a point where they are substantially equal resulting in cancellation of flux at the coupling device 32. This is illustrated in FIG. 8A at the point where the positive portion 80 of the curve 78 passes over to the negative portion 82 of the curve 78. Continued rotary motion of the member 26, brings the elements 56 and 58 closer into alignment with the portions 48 and 52 of circuit 48 decreasing its reluctance. This results in an increase in flux density B at the coupling 32 in the opposite (or negative) direction as illustrated by the portions 82 of the curve 78 in FIG. 8A. When the level of the magnetic flux reaches the triggering level-$B_t$ illustrated by the dashed line 86, the bistable magnetic device 32 alters its magnetic state. This results in a rapid change of flux in the direction opposite to that of its last transition producing a negative-going pulse 90 at corresponding times illustrated in FIG. 8B. In this manner, each revolution of the member 26 produces four output pulses which are delivered by the detecting coil 38 to the signal processing means 90. The output pulses include two sets of alternately occurring positive and negative pulses 88 and 90.

The timing or position of the output pulses may be controlled by the amplitude of the direct current delivered to the energizing coil 59 by the current control means 76. Thus, if DC current is reduced, this will result in a reduced magnetic flux B through the coupling means 32 as represented by the dashed curve 92 of FIG. 8A. The positive and negative peak values although reduced, however, are sufficiently high to exceed the magnetic flux triggering levels $B_t$ (shown by the lines 84 and 86) required for providing output signals by the bistable magnetic device 36 and detecting coil 38. However, a longer time is required for the negative-going and positive-going portions of the curve 92 to cross their respective triggering levels $B_t$. This results, in the production of the delayed or displaced output signals 88' and 90' shown by dashed lines in FIG. 8B. Thus, by controlling the level of energization of the winding 59, the output signals produced and delivered to the signal processing means 90 may be advanced and displaced as desired. The delivery of output pulses 88 and 90 also correspond to particular angular positions of the shaft 28 of the rotary member 26. The output signals delivered by the coil 38, thus, indicates the angular positions of the shaft 28. Particular angular positions of the shaft 28 may also be selected by varying the amplitude of the current delivered to the winding 59 of energizing coil.

For illustrating a particularly useful application of the signal generating means 10, the shaft 28 of the member 26 may be coupled for rotation in synchronism with the crank shaft of an internal combustion engine. For the embodiment illustrated, the energizing coil 38 will deliver four output signals for each rotation. Such output signals may be rectified by the signal processing means 90 and delivered to an ignition system such as previously described for providing spark signals by means of a usual distributor to the spark plugs of a four cylinder engine. The control means 76 by being made to respond to the rate of rotation and load of the engine, will control the advance of the output signals delivered by the signal processing means 90 as already described.

FIGS. 4 to 6 disclose a signal generating apparatus 100 which is a modified form of the apparatus 10. A conducting means 102 for magnetic flux is provided by a portion 104 providing a path of high permeability, and a rotary member 106 providing paths of alterable permeance for varying the reluctance of the conducting means 102. The portion 104 of the conducting means 102 includes first and second sections 108 and 110 which are each substantially "U" shaped and have a high permeability, as provided by well known ferromagnetic materials. The two ends of section 108 provide pole pieces 112 and 114, while the ends of section 110 provide pole pieces 116 and 118. The pole pieces 112, 114, 116 and 118 are arranged in a clockwise direction about and shaped to defining a circumference which is proximate to the outer cylindrical surface 123 of the rotary member 106. The section 108 receives about it, a winding 59' of a solenoid coil which is energized by a direct current signal from current control means 76 as explained in connection with the apparatus 10. A bistable magnetic device 36 and signal detecting coil 38 is received by section 110 of the conducting means 102 for delivering output signals to the signal processing device 90 as previously described.

The pole pieces 114 and 118 of sections 108 and 110 of portion 104 are positioned essentially diagonally opposite to each other and on the same level, while the pole pieces 112 and 116 are also positioned diagonally opposite to each other but are on a lower level as clearly shown in FIG. 6.

The rotary member 106 which is substantially cylindrical in configuration may have a body made of a non magnetic material and is provided with first and second pairs of magnetic flux conducting elements 120 and 122. The pair of elements 120 are positioned diametrically opposite to each other at and extending along the periphery 123 of the member 106. The elements 120 each have an intermediate vertical portion 124, joined with a leading portion 126 at the lower level of the pole pieces 112 and 116, and a trailing portion 128 at the upper level of pole pieces 114 and 118. Thus, when the rotary member 106 is positioned as shown in FIGS. 4 and 6, a flux path 14' is provided. The path 14' is illustrated in FIG. 4 by the dashed lines and the arrows showing direction of flux along the section 108 and from its lower pole piece 112, through one of the pair of elements 120 of the rotary member 106. The path continues from the element 120 to the upper pole piece 118 of the section 110, along section 110 in the counter clockwise direction through the bistable magnetic device 36 to which it is coupled as previously described, and to the pole piece 116. The flux path then passes from the lower pole piece 116 to the other proximately positioned element 120 back to the first section 108 through its pole piece 114 at the upper level. Thus, with magnetic flux induced by the winding 59', a circuit of magnetic flux is provided having a substantially "0" configuration. As the rotary body 106 rotates in a clockwise direction as indicated by the arrow 130, the trailing portion 128 of each of the sections 120 moves away from its upper level pole pieces 114, 118 increasing the air gap therebetween and correspondingly the reluctance of the circuit 14' from the minimum value provided by the member 106 in its position illustrated in FIGS. 4 and 6.

As the member 106 continues to rotate in a clockwise direction through 90° the second pair of elements 22 comprising a horizontal element 132 positioned below a horizontal element 134 move towards and into their positions shown in FIG. 5. The elements 132 and 134 extend diametrically providing enlarged opposite ends at the periphery of the member 106. The ends of the element 132 are at the lower level of the pole pieces 112, 116 while the ends of the element 134 are at the upper level of the pole pieces 114, 118. The elements 132 and 134 are spaced from each other by the non magnetic material of the body of the rotary member 106, and the lower element 132 is displaced 45° in the clockwise direction, with respect to the upper element 134.

With the member 106 positioned as shown in FIG. 5, the flux provided by the energizing winding 59' flows in a magnetic circuit 46' in the direction along the path indicated by the dashed lines and arrows. The flux passes from the lower pole piece 112 of section 108 to the proximate end of the element 132 and through it to its other end and the proximate pole piece 116. Similarly, the element 134 which is displaced counter-clockwise with respect to the element 132 completes a path between the upper pole pieces 118 and 114 at the upper level provided at the top of the rotary member 106. A low reluctance path is thus provided for the circuit 46' which crosses over between diagonally opposite pole pieces 112 and 116 and pole pieces 114 and 118 to provide magnetic flux in a sense through the section 110 (clockwise direction) which is opposite to the sense of magnetic flux provided by the circuit 14'.

As the rotary member 106 continues to rotate in the clockwise direction, the reluctance provided to the circuit 46' increases (while the reluctance in the circuit 14' decreases) unit it becomes maximum again after a displacement of 90° from its position shown in FIG. 5. Thus, with a complete rotation of 360°, the circuit 14' having the "0" configuration goes through variations providing two minimum reluctance (maximum flux density) conditions, while the circuit 46' goes through similar variations in reluctance and flux density delayed by 90°. Since the "8" configuration flux path of circuit 46' provides magnetic flux with a sense which is opposite to that provided by the circuit 14' in section 110, the variation of the combined total flux at the bistable device 36 is also represented by the curves 78 and 92 of FIG. 8A.

Because of differences in the configuration of the pair of elements 120 when compared to the pair of elements 122, an enlarged air gap 136 is provided between the lower pole pieces 112, 116 and the outer cylindrical surface 123 of the member 106 to compensate for and equalize the positive and negative portions 80 and 82 of the magnetic flux variations of curves 78 and 92 of FIG. 8A. The gaps 136 have the effect of controlling the degree of change in reluctance of the circuit 14' as the leading edges 126 of the elements 120 approach the pole pieces 112, 116 to provide a configuration of the positive-going portion of the curve 80 associated the flux of circuit 14' so that it closely matches the configuration of the negative-going portion of the wave 82 associated with the flux of the circuit 46'. This is important for obtaining equally spaced pulses 88 and 90. Of course, other means may also be utilized for achieving this purpose.

For increasing the efficiency of the magnetic path 14' and minimizing leakage of magnetic flux, a pair of electromagnets 140 may be provided between the adjacent pole pieces 112 and 118, and the adjacent pole pieces 114 and 116. The electromagnets 140 are positioned to provide magnetic poles inducing flux in a direction opposite to the direction of the path of flux flow 14' through the elements 120. Thus, when the elements 120 are displaced from their position between respective adjacent pole pieces 112 and 118, and adjacent pole pieces 114 and 116, the electromagnets 140 act to oppose magnetic flow therebetween. The minimizing of leakage is important when magnetic flux is decreasing in the circuit 14' and increasing in the circuit 46'. At such time, the magnetic flux flow is directed by the cross paths of the elements 132, 134 to opposite pole pieces rather than to adjacent pole pieces. The electromagnets 140 may also be provided with increased magnetic flux for opposing leakage flux when the maximum flux level is increased by the current control means 76. This can be achieved by energizing the electromagnets 140 with direct current derived from the current control means 76. In this way, when the level of current to the energizing winding 59′ is increased by the current control means 76, the current to the electromagnets 140 will also be increased for opposing increased leakage flux.

In order to oppose leakage of flux between the cross elements 132 and 134 at their cross over point, a permanent magnet 142 is provided within the rotary member 106 at its center. The permanent magnet 142 is positioned between the elements 132 and 134 to provide magnetic flux in a direction which is opposite to the direction of leakage flux between the elements 132, 134. Thus, if the flux flow provided by the lower element 132 represents a north pole at the center region, and the direction of the flux flow in the upper element 134 represents a south pole, the magnet 142 is positioned with its north pole proximate to the element 132 and its south pole proximate to the element 134.

The signal generating apparatus 100 also illustrates the use of a second bistable magnetic device 38′ which may be similar to the bistable device 38. The device 38′ generates an output signal 144 for each revolution of the rotary member 106 as shown in FIG. 8B. Such marker signal 144 is useful in determining the sequence of output signals 88 and 90 generated during a complete revolution of the rotary member 106. For this purpose, the bistable magnetic device 38′ is secured in a substantially vertical position to the vertical portion 124 of one of the elements 120 for coupling it with the magnetic flux which periodically flows through the elements 120 when they are respectively positioned between the pole pieces 116 and 114 and the pole pieces 112 and 118. An opposite magnetic field is provided, as by a vertically positioned magnet 146 (FIG. 5) positioned just ahead of the pole piece 114 for triggering the device 38′ to one of its states and conditioning it for being triggered to its other state when it is between pole pieces 114 and 116. Thus, when the magnetic flux increases in the circuit 14′ and flows through the element 120, with which the bistable magnetic device 38′ is associated, the density of magnetic flux increases to the point at which it triggers a change of state of the device 38′. With the change of the state, a rapid change in the flux of the magnetic device 38′ occurs providing the "Wiegand Effect." This results in inducing an output voltage signal in the winding of a detecting coil, such as the winding of the electromagnet 140, which is positioned proximate to the magnetic device 38′. Sensing output signals from the device 38′, provides the marker signal 144 occurring at the same position once during each revolution of the rotary member 106. The delivery of such output marker signals 144 also serves to determine the absolute position of the shaft 28′ and of the output pulses 88 and 90 which follow. The output signals 88 and 90 may thus be identified and related to signals for particular cylinders when utilized in an ignition system for an internal combustion engine.

The signal generating apparatus 100, thus, operates in a manner similar to that described in connection with the apparatus 10 to produce varying magnetic flux and output signals as illustrated respectively in FIGS. 8A and 8B. The means 100 also provides utility for determining various positions of its shaft 28′ as well as rotary positions of other devices which may be connected thereto. By adjusting of the energized current to its winding 59′ it may also select various positions at which output signals are delivered to its signal processing means 90. This device, may also be used, as previously noted, in connection with ignition systems of automobiles with internal combustion engines for initiating sparks to the cylinders of an automobile and providing advance spark control.

Of course, it is noted that the apparatuses 10 and 100 may be modified to provide output signals of more or less than the four pulses per revolution provided by their rotary members 26 and 106, respectively. Thus, for example the number of elements 56, 58 of the rotary member 26 of apparatus 10, and the number of elements 120, 122 of the rotary member 106 of apparatus 100, may be increased to increase the number of output pulses. The rotary members 26 and 106 may also be coupled to rotate at higher or lower rates with respect to the crank shaft of an internal combustion engine or other device for providing the required number of sparks or signals for each rotation.

Although several embodiments of the invention have been described in detail, it will be obvious to those skilled in the art that the invention disclosed may be modified to meet particular design circumstances, without substantial departure from the essence of the invention.

What is claimed is:

1. A signal generating apparatus comprising a bistable magnetic device which alters its magnetic state when the density of magnetic flux to which it is subject passes through a predetermined value, detecting means providing an output signal responsive to a change in magnetic state of said bistable device, conducting means for magnetic flux for subjecting said bistable magnetic device to conducted magnetic flux, said conducting means comprising a first portion providing a path of high permeability and a second portion providing a path of alterable permeance for varying the reluctance of said conducting means and the density of magnetic flux to which said bistable device is subject, the conducting means providing a first circuit for magnetic flux with a non cross-over "0" configuration and second circuit with a cross-over "8" configuration for subjecting said bistable device to magnetic flux of opposite senses, and an energizing means providing a controllable magnetic field for inducing magnetic flux in the first and second circuits of said conducting means and providing a flux density sufficient to alter the state of said bistable device with the variation of reluctance of said conducting means.

2. The apparatus of claim 1 in which the path of the second portion of said conducting means includes a variable length gap of reduced permeability for varying the reluctance of said conducting means.

3. The apparatus of claim 2 in which the variable length gap is provided by a fixed gap of reduced permeability and a member providing a path of high permeability movable within said fixed gap.

4. The apparatus of claim 3 in which said member is rotatable for periodically varying the reluctance provided by said second portion.

5. The apparatus of claim 4 in which said member includes at least one element having an elongated configuration providing a minimum value of reluctance when it is in one of its angular positions aligned with the flux path of said second portion and providing a maximum value of reluctance when it is in an angular position intermediate its aligned positions, said member providing reluctance values varying between said minimum and maximum values as a continuous function of its angular position.

6. The apparatus of claim 5 in which said energizing means includes an energizing coil wound about the first portion of said conducting means and an energizing source providing direct current to said coil, the value of the direct current provided to said coil being adjustable for determining an angular position of said member at which said bistable device is subject to said predetermined value of flux density for altering its magnetic state and said detecting means provides an output signal.

7. The apparatus of claim 6 in which said member includes shaft means adapted to be rotatively driven in synchronism with an internal combustion engine for providing spark timing signals derived from said detecting means, and including a current control means varying the value of the direct current provided to said coil for advancing and retarding the occurrence of the output signals of said detecting means with respect to the angular position of said member for being responsive to the requirements of an internal combustion engine.

8. The apparatus of claim 6 or 7 in which ferromagnetic material provides the path of high permeability and air provides the path of reduced permeability of said conducting means, the first and the second portions are arranged to provide a series path for the magnetic flux induced by said coil, and said bistable device is subject to the magnetic flux in the path of the first portion of said conducting means.

9. A signal generating apparatus comprising a bistable magnetic device which alters its magnetic state when the density of magnetic flux to which it is subject passes through a predetermined value, detecting means providing a output signal responsive to a change in magnetic state of said bistable device, conducting means for magnetic flux for subjecting said bistable magnetic device to conducted magnetic flux, said conducting means comprising first and third portions each providing a path of high permeability and a second portion providing a path of alterable permeance for varying the reluctance of said conducting means and the density of magnetic flux to which said bistable device is subject, first and second circuits for magnetic flux each comprising a respective one of said conducting means including said first, second and third portions, and an energizing means providing a controllable magnetic field for inducing magnetic flux in said conducting means and providing a flux density sufficient to alter the state of said bistable device with the variation of reluctance of said conducting means, said energizing means inducing magnetic flux in the first and second circuits of said conducting means with the magnetic flux having opposite senses respectively in the third portions of said first and second circuits, said bistable device being subject to the combined magnetic flux of the third portions of the first and second circuits of said conducting means.

10. The apparatus of claim 9 in which the path of each of the second portions of said first and second circuits is provided with a variable length gap of reduced permeability for varying the reluctance of their respective circuits.

11. The apparatus of claim 10 in which the variable length gap of each of said second portions is provided by a fixed gap of reduced permeability and a member providing a path of high permeability movable within each of said fixed gaps.

12. The apparatus of claim 11 in which said member is rotatable for periodically varying the reluctances provided by said second portions.

13. The apparatus of claim 12 in which said member provides at least one element of high permeability for each gap, each element having an elongated configuration and providing a minimum value of reluctance when it is in one of its angular positions aligned with the flux path of its second portion and providing a maximum value of reluctance when it is in an angular position intermediate its aligned positions, each element of said member providing reluctance values varying between said minimum and maximum values as a continuous function of its angular position, the elements of said member providing maximum reluctance for one of said circuits while the other circuit has minimum reluctance for alternately subjecting said bistable device to varying magnetic flux of opposite senses with the rotation of said member.

14. The apparatus of claim 13 in which at least a part of the first portions of said circuits are proximately positioned, said energizing means includes an energizing coil wound about the proximate parts of the first portions of said conducting means providing therein magnetic flux of the same sense, and an energizing source providing direct current to said coil, the value of direct current provided to said coil being adjustable for determining the angular positions of said member at which said bistable device is subject to said predetermined value of flux density for altering its magnetic state and said detecting means provides output signals.

15. The apparatus of claim 14 in which said member includes a shaft means adapted to be rotatively driven in synchronism with an internal combustion engine for providing spark timing signals derived from said detecting means, and including a current control means varying the value of the direct current provided to said coil for advancing and retarding the occurrence of the output signals of said detecting means with respect to the angular position of said member for being responsive to the requirements of an internal combustion engine.

16. The apparatus of claim 14 or 15 in which ferromagnetic material provides the paths of high permeability and air provides the paths of reduced permeability of said conducting means, each circuit has its first, second and third portions arranged to provide a series path for magnetic flux induced in it by said coil, the second portions are positioned proximate to each other with their gaps in alignment for receiving said member, said first circuit provides a non corss-over "0" configuration path for magnetic flux while said second circuit provides a cross-over "8" configuration path, and the third portions are positioned proximate to each other and include a coupling means receiving and subjecting said bistable device to the magnetic flux of each of said third portions.

17. A signal generating apparatus comprising a bistable magnetic device which alters its magnetic state when the density of magnetic flux to which it is subject passes through a predetermined value, detecting means providing an output signal responsive to a change in magnetic state of said bistable device, conducting means for magnetic flux for subjecting said bistable magnetic device to conducted magnetic flux, said conducting means comprising a first portion providing a path of high permeability and a second portion providing a path of alterable permeance for varying the reluctance of said conducting means and the density of magnetic flux to which said bistable device is subject, the first and second portions of said conducting means providing first and second circuits for magnetic flux, the first portion of said conducting means having first and second sections each with first and second pole ends spaced from each other about and defining a circumference, said second portion providing said first circuit with paths for magnetic flux directly between the pole ends of different sections which are adjacently positioned along said circumference and providing said second circuit with paths for magnetic flux which cross-over each other between pole ends of different sections which are non-adjacently positioned along said circumference, said second portion conditionally providing the paths of said first and second circuits with high and reduced permeabilities, and an energizing means providing a controllable magnetic field for inducing magnetic flux in said conducting means and providing a flux density sufficient to alter the state of said bistable device with the variation of reluctance of said conducting means, said energizing means inducing magnetic flux in a first sense in the first section of said conducting means, while in the second section the first circuit provides induced magnetic flux in the first sense and the second circuit provides induced magnetic flux in a second opposite sense, said bistable device being subject to the combined magnetic flux of said first and second circuits in the second setion of said conducting means.

18. The apparatus of claim 17 in which said second portion includes a member which is positioned within said circumference proximate to the pole ends of said first portion and is rotatable for altering the permeability of the first and second paths and varying the reluctance of said first and second circuits.

19. The apparatus of claim 18 in which said member has a plurality of elements of high permeability providing a first pair and a second pair of elements, said member providing a minimum value of reluctance for said first circuit when in a first angular position aligning the first pair of elements along the paths between the pole ends of different sections which are adjacently positioned along said circumference, said member providing a minimum value of reluctance for said second circuit when in a second angular position aligning the second pair of elements along the paths which crossover each other between pole ends of different sections which are non-adjacently positioned along said circumference, said member providing a maximum value of reluctance for said first and second circuits respectively when said member is correspondingly in its second and first positions, said member providing reluctance values varying between said minimum and maximum values respectively for said first and second circuits as continuous functions of its angular position.

20. The apparatus of claim 19 in which each of the first pair of elements of said member extends along a segment of said circumference and said second pair of elements cross-over each other and have spaced ends at opposite locations at said circumference between said first pair of elements, the first pair of elements are respectively along and span the space between the pole ends of different sections of said first portion which are adjacently positioned along said circumference when said member is in its first position and are removed from said space when said member is in its second angular position, the second pair of elements which cross-over each other are spaced from each other and are positioned between and have their ends respectively in proximate relationship to the pole ends of different sections which are non-adjacently positioned along said circumference when said member is in its second position and are removed from said proximate relationship with the pole ends when said member is in its first angular position.

21. The apparatus of claim 20 in which the first pole ends of said sections provide pole pieces substantially diagonally across from each other at a first level about said circumference and said second pole ends provide pole pieces substantially diagonally across from each other at a second level below said first level about said circumference, the first pair of elements of said member extend between said first and second levels of said pole pieces for conditionally providing paths of high permeability between pole pieces of pole ends of different sections of said first portion which are adjacently positioned along said circumference, the second pair of elements each extend along a respective one of said first and second levels for conditionally providing a path of high permeability between the pair of pole pieces corresponding to its level.

22. The apparatus of claim 21 which includes magnetic means providing one or more magnetic fields inducing magnetic flux having a sense opposite to the sense of leakage flux between said pole pieces outside of said elements.

23. The apparatus of claim 22 in which said magnetic means includes at least one electro magnet energized by said energizing means positioned along said circumference between adjacent pole pieces of different sections, and a magnet within said member between the elements of the second pair of elements and with its poles proximate to respective ones of said second pair of elements.

24. The apparatus of claim 17 in which said energizing means includes an energizing coil wound about the first section of said conducting means and an energizing source providing direct current to said coil, the value of direct current to said coil being adjustable for determining the angular position of said member at which said bistable device is subject to said predetermined value of flux density for altering its magnetic state and said detecting means provides an output signal.

25. The apparatus of claim 24 in which said second portion includes a member which is positioned within said circumference proximate to the pole ends of said first portion and is rotatable for altering the permeability of the first and second paths for varying the reluctance of said first and second circuits, and includes shaft means adapted to be rotatively driven in synchronism with an internal combustion engine for providing spark timing signals derived from said detecting means, and including a current control means varying the value of the direct current provided to said coil for advancing and retarding the occurrence of the output signals of said detecting means with respect to the angular position of said member for being responsive to the requirements of an internal combustion engine.

26. The apparatus of claim 25 which includes another said bistable magnetic device mounted for rotation with said member, said detecting means providing a plurality of output signals from the first said bistable magnetic device and one output signal from the last said bistable device for each complete rotation of said member.

27. The apparatus of claim 23 or 25 in which ferromagnetic material provides the paths of high permeability and air provides the paths of reduced permeability of said conducting means, the first and second portions of said conducting means are arranged to provide each of said circuits with a series path for magnetic flux induced in it by said coil, said first circuit provides a non cross-over "0" configuration path for magnetic flux while said second circuit provides a cross-over "8" configuration path, and which includes a coupling means for subjecting said bistable device to the magnetic flux in the second section of said conducting means.

* * * * *